United States Patent [19]

D'Allura

[11] Patent Number: 5,407,712
[45] Date of Patent: Apr. 18, 1995

[54] FORTUNE FLOWER

[75] Inventor: John D'Allura, Dana Point, Calif.

[73] Assignee: Terrance J. Olsen, Placentia, Calif.

[21] Appl. No.: 100,967

[22] Filed: Aug. 3, 1993

[51] Int. Cl.⁶ ............................................. A47G 7/00
[52] U.S. Cl. .......................................... 428/22; 47/58;
                                                      428/23; 428/24
[58] Field of Search ............... 428/24, 40, 23, 22;
                                                      47/58, 58.01

[56] References Cited

U.S. PATENT DOCUMENTS

| | | | |
|---|---|---|---|
| 514,482 | 2/1894 | Mayer-Schliewen | 428/24 X |
| 2,880,862 | 4/1959 | Sermattei | 428/40 |
| 4,490,940 | 1/1985 | Geiges | 428/24 X |
| 4,524,541 | 6/1985 | Geiges, Jr. | 428/24 X |

Primary Examiner—Henry F. Epstein
Attorney, Agent, or Firm—Georges A. Maxwell

[57] ABSTRACT

In combination; a yet to fully open and bloom flower pistil or bud; and, an elongate strip of thin flexible and resilient sheet material having a surface with a fortune applied thereto; said strip is yieldingly, spirally rolled into an elongate cylindrical form and is positioned within the corolla of the bud in substantial axial alignment with the central longitudinal axis of the bud and within the central assembly of petals to be releasably contained thereby; said petals progressively release and allow the strip to unroll and emerge from within the bud as the bud opens toward full bloom.

11 Claims, 2 Drawing Sheets

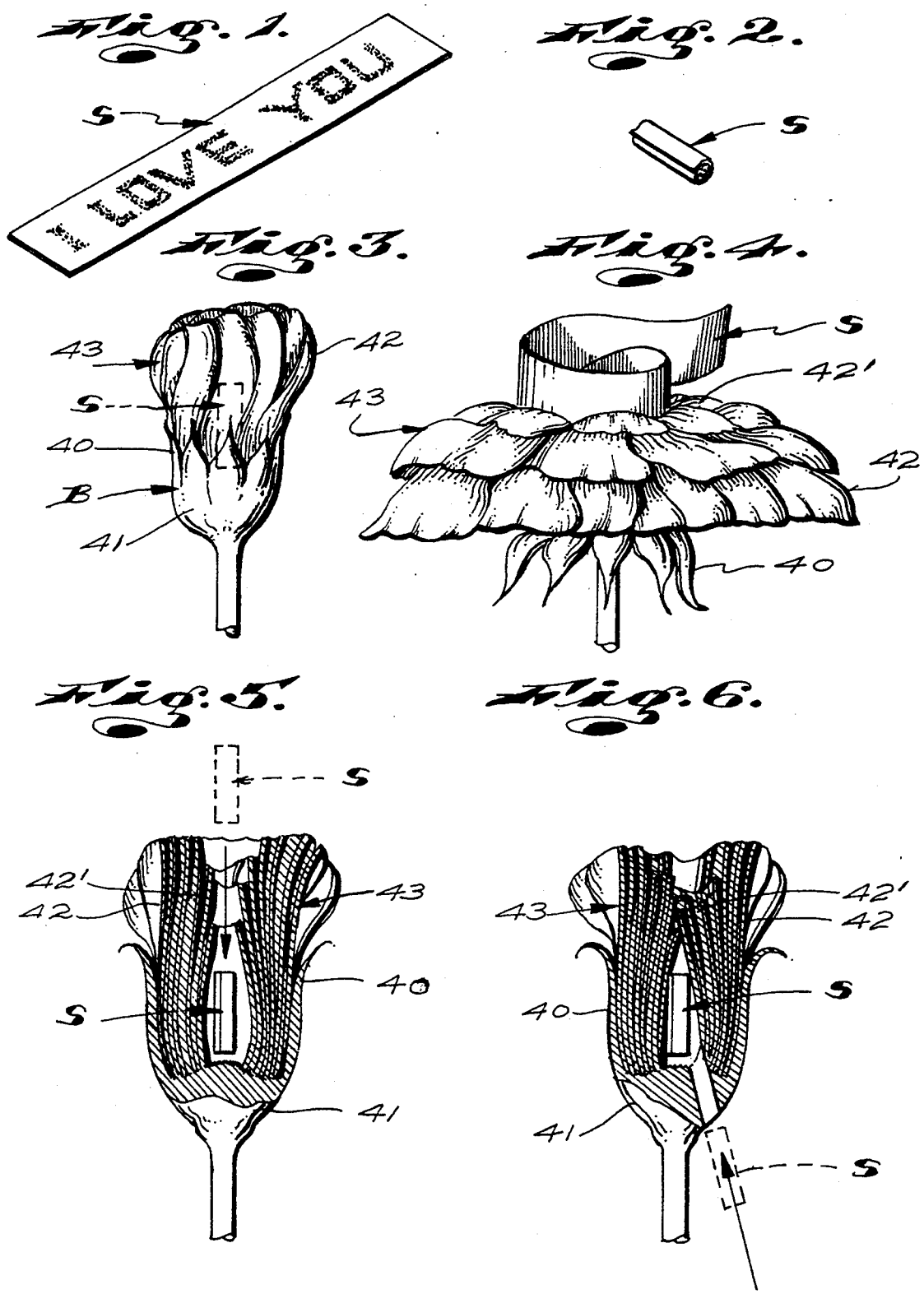

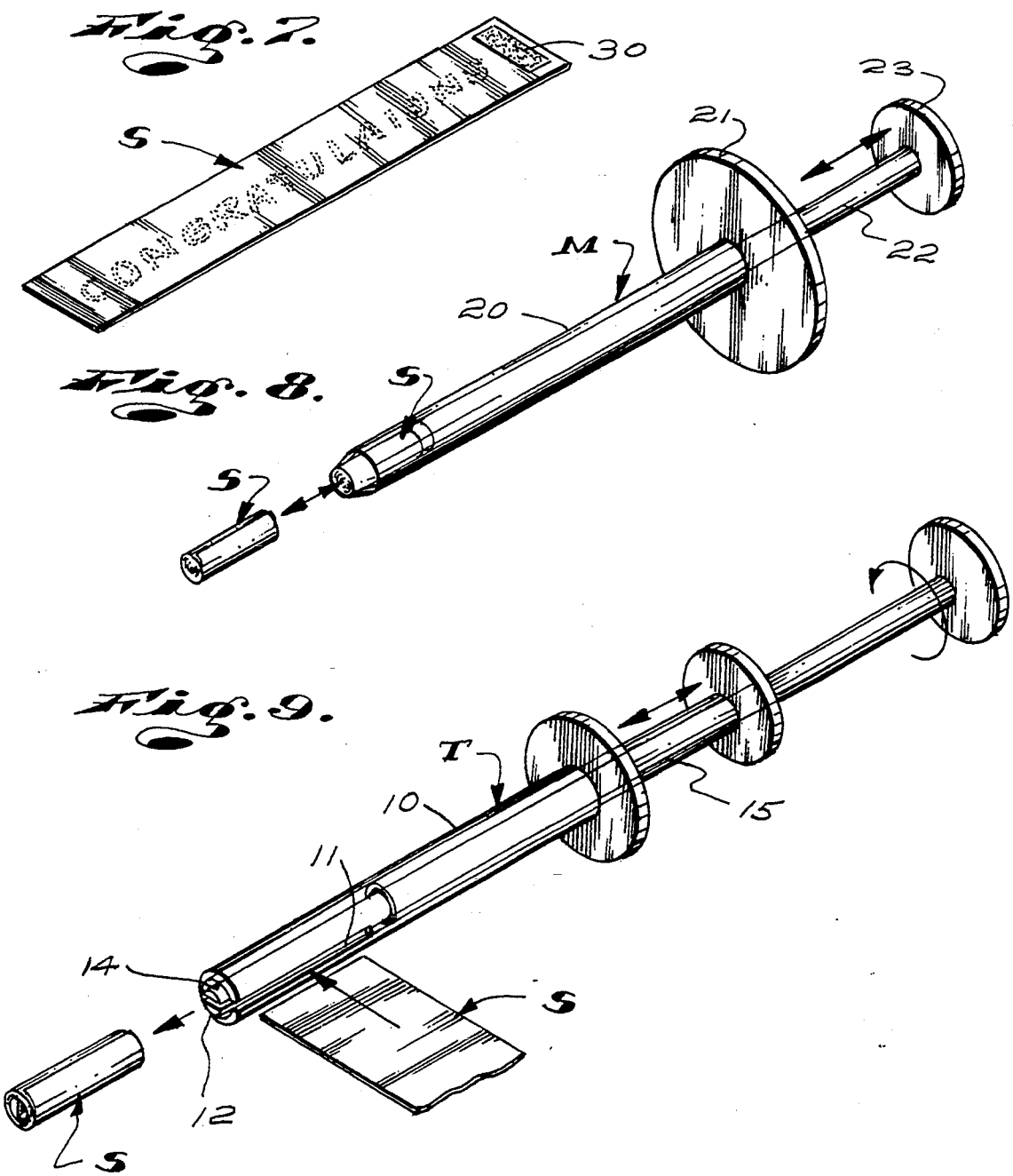

5,407,712

FORTUNE FLOWER

BACKGROUND OF THE INVENTION

This invention has to do with the transmittal of messages and the like and is particularly concerned with the transmission and display of messages from within flower buds as they mature to full bloom.

It is an old and well established custom for persons who desire to express their feelings to others to directly or indirectly present the others with gifts of flowers, such as roses.

Flowers are also presented and/or displayed to celebrate happenings or events of importance, such as weddings and anniversaries.

As a general rule, when flowers, such as roses, are presented to one as a gift, young, fresh, yet to fully open or bloom buds are presented so that the recipient of the flowers can watch and enjoy them for several days, as they open to full bloom.

Often, a gentleman, enamored of a woman, will present her with a single rose bud as a symbol of his love for her.

It is also an old and well established custom for a person who is desirous of expressing his or her care and/or feelings for another person to present that other person with a printed or written message that appropriately expresses his or her care and/or feelings. Such messages are also presented to celebrate special events and happenings. Such messages often consist of single words such as "love," "peace," "hope," and "congratulations"; or, short phrases such as "I love you," "Be mine," "Happy Anniversary," "Happy Birthday," and various other maxims and/or fortunes.

Such messages are often generically referred to as "fortunes" and for the purpose of this disclosure, will be identified as such.

One old and well-known form of presenting a fortune is a fortune cookie. That is, a cookie made from a thin layer of dough folded and baked around a slip of paper bearing a fortune. A fortune cookie is broken open by its recipient to gain access to the message or fortune.

The present invention resides in a novel combining of the above-noted customs, that is, the presentation of a flower and the presentation of a fortune, as a unit. More particularly, the present invention consists of positioning a strip of sheet material bearing a fortune within a yet to fully open or bloom petals of a flower bud and such that the strip emerges from within the bud and becomes exposed as the bud opens to full bloom.

PRIOR ART

It has been found that the practice of engaging elongate strips of paper bearing fortunes about the stems of artificial flowers has been practiced in the past. For example, Veterans organizations have long engaged such strips of paper about the stems of those imitation poppy flowers that the organization distributes on those holidays on which American war veterans are celebrated. Similar strips of paper are often related to the stems of artificial flowers as tags or labels for identification purposes.

It is understood and believed that nobody, prior to the date of my invention, deposited strips of paper or the like bearing fortunes within the buds of flowers and which are progressively released from within the buds and displayed as the buds open to full bloom.

OBJECTS AND FEATURES OF MY INVENTION

It is an object of my invention to provide a fortune flower comprising a flower bud carrying an elongate flexible and resilient spirally wound, self-emerging fortune strip bearing a fortune (fortune strip).

It is an object and feature of the invention to provide a fortune flower of the character referred to above wherein the strip is spirally wound into a cylindrical form and placed substantially central within the corolla of the bud where it is substantially obscured from view and from within which it emerges as the petals of the corolla splay and the bud opens to full bloom.

An object and feature of my invention is to provide a fortune flower of the general character referred to above wherein the fortune strip is established of thin resilient sheet material that can be yieldingly spirally wound and releasably held in tight compact cylindrical form and that spirally expands and unwinds when released.

It is another object and feature of the present invention to provide a fortune strip for a fortune flower of the general character referred above that is such that any desired fortune can be imprinted or otherwise applied to it in the process of establishing my new fortune flower.

Another object and feature of this invention is to provide a fortune flower of the general character referred to above wherein the fortune strip (in spirally wound form) can be inserted into the corolla of the flower bud from the outer free end of the bud or can be inserted into the corolla of the bud through the calyx of the bud, adjacent the flower stem.

The foregoing and other objects and features of my invention will be apparent and will be fully understood from the following detailed description of the invention throughout which descriptive reference is made to the accompanying drawings.

BRIEF DESCRIPTION OF THE DRAWINGS

FIG. 1 is an isometric view of a fortune strip;

FIG. 2 is an isometric view of the fortune strip in spirally wound, cylindrical form;

FIG. 3 is a view of a yet to fully bloom flower bud with the spirally wound fortune strip shown in dotted lines within it;

FIG. 4 is a view showing the flower bud in a more fully bloomed condition and showing the fortune strip partially unwound and emerging therefrom;

FIG. 5 is a diagrammatic view showing one way of inserting a fortune strip into a flower bud;

FIG. 6 is a diagrammatic view showing another way of inserting a fortune strip into a flower bud;

FIG. 7 is an isometric view of a fortune strip having a moisture soluble adhesive at one end thereof that releasably holds the strip in spirally wound form preparatory to inserting it in a bud;

FIG. 8 is an isometric view of one form of tool that can be used to remove a core from a flower bud preparatory to positioning a fortune strip therein and that can be used to receive a fortune strip and to inject the strip into a flower bud; and, FIG. 9 is a view of a tool to receive and spirally wind a fortune strip and to insert the strip into a flower bud.

DETAILED DESCRIPTION OF THE INVENTION

In FIG. 1 of the drawings, I have shown an elongate fortune strip S. The dimensions of the strip S can vary widely and are generally determined by the size and nature of the flower bud within which the strip is to be positioned. The strip S might, for example, be approximately ¼" wide and 1½" long and about 1 or 2 mils thick. The strip has a flat front surface or face on which a fortune, such as "I love you," is printed or otherwise applied.

In practice, fortune strips S with standard fortunes, such as "I love you," "Good Luck," and "Happy Anniversary" can be printed and cut from large flat sheets of material and rolled into cylindrical form to establish a supply of fortune strips; or, can be printed with any desired and/or suitable fortune at the time that a fortune flower is being established. For example, fortune strips can be made of standard label-making plastic ribbon stock by means of any one of several commercially available label-making machines such as are produced by Mitsubishi Electric America, Panasonic, and other office machine manufacturers. Typically, the ribbon stock provided to make labels through label-making machines is Mylar plastic film about 1 mil thick. Further, such ribbon stock is typically provided with an adhesive coating on its back surface, which coating is covered with a removable backing of plastic film. Accordingly, when such ribbon stock is utilized to establish my new fortune strips; after the strips have emerged from their related flowers, the recipient of the fortune flowers can remove the backing from the strips and apply or stick the strips onto any desired supporting structure for preservation.

Prior to inserting the strip S in a related flower bud, the strip is yieldingly spirally wound into that small in diameter structurally stable and stiff cylindrical form shown in FIG. 2 of the drawings.

In practice, the method and means for spirally winding the fortune strip into cylindrical form can vary widely without in any way affecting the broader aspects and spirit of my invention. For the purpose of this disclosure, I have, in FIG. 9 of the drawings, shown one form of tool T that can be utilized to receive and spirally wind a fortune strip S and that can thereafter be utilized to insert or inject the wound fortune strip into a related flower bud. The tool T includes an outside tubular case 10 with a longitudinal slot 11 in and through which the inner end of a strip S can be entered. The tool T next includes a central bifricated or slotted rotatable shaft 12 that extends longitudinally of the case 10 and cooperates therewith to define and annulus 14 to accommodate the strip, as it is wound up about the shaft. The inner end of the strip S, within the case 10, is engaged in the slot in the shaft and the shaft is rotated to wind the strip thereabout and within the case. Finally, the tool T includes an elongate tubular ejector tube 15 that is slidably engaged about the rear portion of the shaft and that is shiftable forwardly into and through the annulus 14 to engage and eject the spirally wound strip from within the case and from about the shaft. The spirally wound fortune strip can be transferred directly from within the tool T into a related flower bud. The tool is shown as it might appear if the case 10 and tube 15 were molded of a transparent plastic material.

Alternatively, strips S can be ejected from the tool T directly into elongate open-ended cylindrical fortune strip cartridge in which a plurality of strips can be stored in end-to-end relationship and from which they can be ejected, one at a time, by means of an ejector rod or plunger shiftably engaged within the cartridge. In FIG. 8 of the drawings, I have shown a tool M with an elongate cartridge tube 20 in which one or more spirally wound strips S can be engaged and carried, in end-to-end relationship.

The cartridge tube 20 of the tool M has an open front end into and from which the strips can be entered and ejected and has a finger-engaging flange 21 at its rear end. An elongate plunger 22 with a thumb-engaging pad 23 that is slidably entered in the rear end of the cartridge and manually shiftable therein to eject the strips S from within the cartridge.

It is to be noted that the tools T and M work to hold the spirally wound fortune strips S in tight wound condition until the strips are ejected therefrom.

In practice, if desired and as shown in FIG. 7 of the drawings, a patch of adhesive 30 can be applied to the outer free end portion of the strip S. The patch of adhesive serves to releasably secure the end of the strip to the next to last turn of the strip, when the strip is wound. When provided with the above-noted adhesive patch 30, the strip or strips need not be contained and held against unwinding prior to their being inserted into related flower buds. The adhesive used is a suitable water-soluble adhesive that is caused to release when subjected to the moisture within a related flower bud or that can be caused to release by sprinkling or otherwise moistening the flower bud with water after the strip is positioned within it.

The fortune flower of my invention next includes a live yet to fully open or fully bloomed flower bud B, such as a rose bud, in which the outer sepals 40 of the calyx 41 have not yet fully parted to release the outer petals 42 of the corolla 43 and wherein the inner petals 42' of the corolla remain in close leafed and/or overlapping engagement with each other, about the central longitudinal axis of the bud, along and about which the ovary, the style and stigma and the anther and filament of the bud lie.

The cylindrical, spirally wound fortune strip S is entered into the central portion of the bud B with an inner or lower end thereof at or in close proximity to or within the ovary, with its central portion within the inner petals 42' and with its upper end below the upper edge portions of the outer petals 42 of the corolla. The corolla of the bud encapsulates and holds the strip S.

With the fortune flower thus established, the bud is let to open or bloom. As the bud blooms, the sepals of the calyx separate and turn radially outwardly and downwardly and away from the outer petals of the corolla and the outer petals of the corolla turn radially outwardly to free the inner petals, which move outwardly. As the petals approach full open position, the sprially wound strip S commences to open spirally outwardly and to emerge from within the bud or flower, into full view where it invites a viewer to pull or pluck it from within the bud or flower and to read the fortune thereon.

As a general rule, the outer end portion of the strip S is the first portion of the strip to move an appreciable distance outward and that end of the strip has a tendency to telescopically move upwardly and radially outwardly above the inner petals of the corolla. As a result, the outer end portion of the strip often appears as a very attractive and somewhat hellically formed leading end portion of the strip emerging from within the heart or center of the opening bloom.

In practice, the resiliency of the material from which the strip S is made is utilized and serves to assist full opening and blooming of the bud or flower.

In a bouquet of buds, some of which have fortune strips placed in them and other of which are without fortune strips, the buds with the strips tend to open sooner and more fully than the buds without the strips. The buds without the strips often wilt before they fully open.

It has been found that the damage to the bud caused by the insertion and/or presence of the fortune strip therein causes no appreciable adverse affects. It does not noticeably mutilate the bud or flower and does not appreciably shorten the useful life of the bud or flower, for display purposes. The buds and/or flowers of a bouquet of buds, some of which have and some of which do not have fortune strips positioned therein appear to fade and wilt at about the same rate.

In practice, if the spirally wound self-merging fortune strip S is inserted into the bud B from the top of the bud, as shown in FIG. 5 of the drawings, care must be taken, when inserting the strip, not to crush, tear, or unduly spread petals.

In practice, if the spirally wound fortune strip S is inserted from below the bud, through the calyx thereof, as shown in FIG. 6 of the drawings, it is preferred that the bud be cut or formed with a coring tool, similar to the tool M shown in FIG. 8 of the drawings, to form a passage and/is a cavity in the bud through and into which the strip can be easily inserted. The coring tool cuts cleanly into the bud without crushing, tearing or otherwise mutilating the bud. The opening in the calyx established by the coring tool is below the visible portions of the bud and is obscured by the sepals of the calyx as they turn outwardly and downwardly and is therefore so unobtrusive that it is not likely to be noticed; and, if noticed, is not objectionable.

It has been found that if the bud is not initially cored to establish an opening to receive the fortune strip S, the strip cannot be easily inserted without excessive bruising and possible rupturing or splitting of the calyx and/or adversely disturbing other parts and/or portions of the bud.

In accordance with the foregoing it will be apparent that my new and uniquely formed fortune strip in combination with the live and blooming bud establishes a novel combination and relationship of parts having a unique dynamic rule of action wherein radial and axial spirally unwinding and display of the self-emerging fortune strip and the opening and blooming of the bud are mechanically related to take place substantially simultaneously.

Having described only typical preferred forms and embodiments of my invention, I do not wish to be limited to the specific details herein set forth but wish to reserve to myself any modifications and/or variations that might appear to those skilled in the art and which fall within the scope of the following claims.

Having described my invention, I claim:

1. In combination, a live yet to fully bloom elongate vertically extending flower bud having a multiplicity of circumferentially and radially spaced petals with lower inner ends joined with a related part of the bud and upper outer end portions projecting substantially upwardly from said lower ends, a self-emerging fortune strip comprising a normally substantially flat, straight elongate ribbon-like fortune strip of thin flexible resilient sheet material with a front surface on which a fortune is applied and yieldingly spirally wound into an elongate cylindrical form, the cylindrically wound resilient strip is positioned substantially centrally within the petals of the bud and is yieldingly releasably held in spirally wound form thereby, as the bud blooms the upper outer end portions of the petals turn radially outwardly and downwardly and progressively release and allow the strip to spirally unwind and expand radially outwardly and upwardly and to emerge from within the bloom.

2. The combination set forth in claim 1 wherein the spirally wound strip normally yieldingly expands radially outwardly within the petals and assists radial outward and downward turning of the petals toward fully bloomed positions.

3. The combination set forth in claim 1 wherein the spirally wound strip is positioned within an elongate cylindrical core opening formed in the bud.

4. The combination set forth in claim 1 wherein the spirally wound strip normally yieldingly expands radially outwardly within the petals and assists radial outward and downward turning of the petals toward fully bloomed positions, said strip being positioned within an elongate cylindrical core opening formed in the bud.

5. The combination set forth in claim 1 wherein the strip has a rear surface with a self-adhesive coating and a removable cover sheet normally overlying the coating, the cover sheet is removable from the strip and the strip is adhesively engageable with an object for viewing after the strip has emerged and is removed from the bud.

6. The combination set forth in claim 1 wherein the strip has a rear surface with a self-adhesive coating and a removable cover sheet normally overlying the coating, the cover sheet is removable from the strip and the strip is adhesively engageable with an object for viewing after the strip has emerged and is removed from the bud; the spirally wound strip is positioned within an elongate cylindrical core opening formed in the bud.

7. The combination set forth in claim 1 wherein the strip has a rear surface with a self-adhesive coating and a removable cover sheet normally overlying the coating, the cover sheet is removable from the strip and the strip is adhesively engageable with an object for viewing after the strip has emerged and is removed from the bud; the spirally wound strip is positioned within and elongate cylindrical core opening formed' in the bud; the spirally wound strip normally yieldingly expands radially outward within the petals and assists radial outward and downward movement of the petals toward fully bloomed positions.

8. In combination, a live yet to fully bloom flower bud on the upper end of a vertically extending stem and including a calyx having circumferentially spaced elongate sepals about and extending substantially upwardly from the upper end of the stem and a multiplicity of circumferentially and radially spaced elongate petals with lower ends within the calyx and upper ends extending above the calyx; and, an elongate ribbon-like fortune strip of thin flexible resilient material having a front surface with a fortune applied thereto, inner and outer ends and upper and lower edges; the fortune strip is yieldingly wound concentrically about its inner end into a small elongate cylindrical spiral form and is positioned within the bud substantially centrally and axially within the petals of the bud where it is releasably held in spirally wound form thereby; said sepals and petals turn radially outward and away from the strip as the bud blooms to release and allow the strip to spirally unwind and emerge from within the bud.

9. The combination set forth in claim 8 wherein the spirally wound strip normally yieldingly expands radially outward within the petals and assists radial outward and downward turning of the petals towards fully bloomed positions.

10. The combination set forth in claim 8 wherein the spirally wound strip is positioned within an elongate cylindrical core opening formed in the bud.

11. The combination set forth in claim 8 wherein the spirally wound strip is positioned within an elongate cylindrical core opening formed in the bud; and assists radial outward and downward turning of the petals towards fully bloomed positions.

* * * * *